(12) United States Patent
Sawyer et al.

(10) Patent No.: US 11,290,379 B2
(45) Date of Patent: Mar. 29, 2022

(54) EGRESS TRAFFIC STEERING CONTROLLER

(71) Applicant: VERIZON PATENT AND LICENSING INC., Basking Ridge, NJ (US)

(72) Inventors: Derrick Sawyer, Santa Clarita, CA (US); Harkeerat Singh Bedi, Los Angeles, CA (US); Carl Tewksbury, Venice, CA (US); Anant Shah, Los Angeles, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 21 days.

(21) Appl. No.: 16/822,227

(22) Filed: Mar. 18, 2020

(65) Prior Publication Data

US 2021/0297345 A1    Sep. 23, 2021

(51) Int. Cl.
| | |
|---|---|
| *H04L 12/721* | (2013.01) |
| *H04L 12/707* | (2013.01) |
| *H04L 12/935* | (2013.01) |
| *H04L 45/00* | (2022.01) |
| *H04L 49/00* | (2022.01) |

(52) U.S. Cl.
CPC .............. *H04L 45/70* (2013.01); *H04L 45/22* (2013.01); *H04L 49/3009* (2013.01)

(58) Field of Classification Search
CPC ... H04L 43/00; H04L 43/04; H04L 43/08–50; H04L 45/00; H04L 45/22; H04L 45/28; H04L 45/70; H04L 49/00; H04L 49/30; H04L 49/3009; G06F 11/00; G06F 11/008; G06F 11/0796; G06F 11/30–3006; G06F 11/3051–3058
See application file for complete search history.

(56) References Cited

U.S. PATENT DOCUMENTS

| | | | | |
|---|---|---|---|---|
| 7,152,179 | B1* | 12/2006 | Critchfield | H04L 12/56 714/4.11 |
| 8,139,479 | B1* | 3/2012 | Raszuk | H04L 43/0811 370/228 |
| 8,738,766 | B1* | 5/2014 | Kazerani | H04L 45/70 709/224 |
| 2004/0233891 | A1* | 11/2004 | Regan | H04L 12/4633 370/351 |

(Continued)

OTHER PUBLICATIONS

"Border Gateway Protocol", Network Galaxy (Year: 2013).*

*Primary Examiner* — Boris D Grijalva Lobos

(57) ABSTRACT

A controller may identify a problematic path from several paths over which to route egress traffic from a site, may determine a threshold amount of traffic to shift from the problematic path, and may implement different potential traffic shifts for shifting similar amounts of traffic as the threshold amount. The controller may provide the labels or header values that different nodes in the site may place in the egress traffic in order to control which path is used to distributed that egress traffic. The controller may modify routing policies affecting different Autonomous System numbers, address prefixes, or other routing parameters to select and/or shift egress traffic, that is associated with those routing parameters and that is about equal to the threshold amount of traffic, from the problematic path to a different path.

20 Claims, 9 Drawing Sheets

(56) References Cited

U.S. PATENT DOCUMENTS

| | | | | |
|---|---|---|---|---|
| 2005/0243723 A1* | 11/2005 | Randriamasy | .......... | H04L 45/00 |
| | | | | 370/235 |
| 2011/0305169 A1* | 12/2011 | Karuppiah | ............ | H04L 45/125 |
| | | | | 370/256 |
| 2015/0036684 A1* | 2/2015 | Modi | ....................... | H04L 45/38 |
| | | | | 370/389 |
| 2016/0294681 A1* | 10/2016 | Khakpour | ............. | H04L 45/306 |
| 2018/0220283 A1* | 8/2018 | Condeixa | .......... | H04W 28/0215 |

* cited by examiner

EGRESS TRAFFIC STEERING CONTROLLER

BACKGROUND

A distributed platform may have multiple sites from which to distribute content, services, and/or data to requesting users, devices, and/or systems. Each distributed platform site may have two or more transit provider and/or network paths with which to distribute the content, services, and/or data to a destination.

Each transit provider and/or network path may include a different set of network links, hops, circuits, and/or devices for reaching the destination. Accordingly, each path may provide nodes (e.g., servers, hosts, services, etc.) within a particular distributed platform site with a different point of egress and/or a different network traversal with which to exchange messaging with the destination. The different network traversals may result in different performance and cost being associated with each path and/or the transmission of egress traffic thereon.

Routers at each distributed platform site may control the distribution of egress traffic on the paths based on configured routes. The routes may select one particular path as an optimal path for the egress traffic, and may leverage the other paths in the event that the optimal path fails. Such an approach may not account for the continually changing properties of the paths and may lead to an unbalanced utilization of the paths, which in turn could result in degraded performance and increased costs.

DETAILED DESCRIPTION OF PREFERRED EMBODIMENTS

Figure 1:
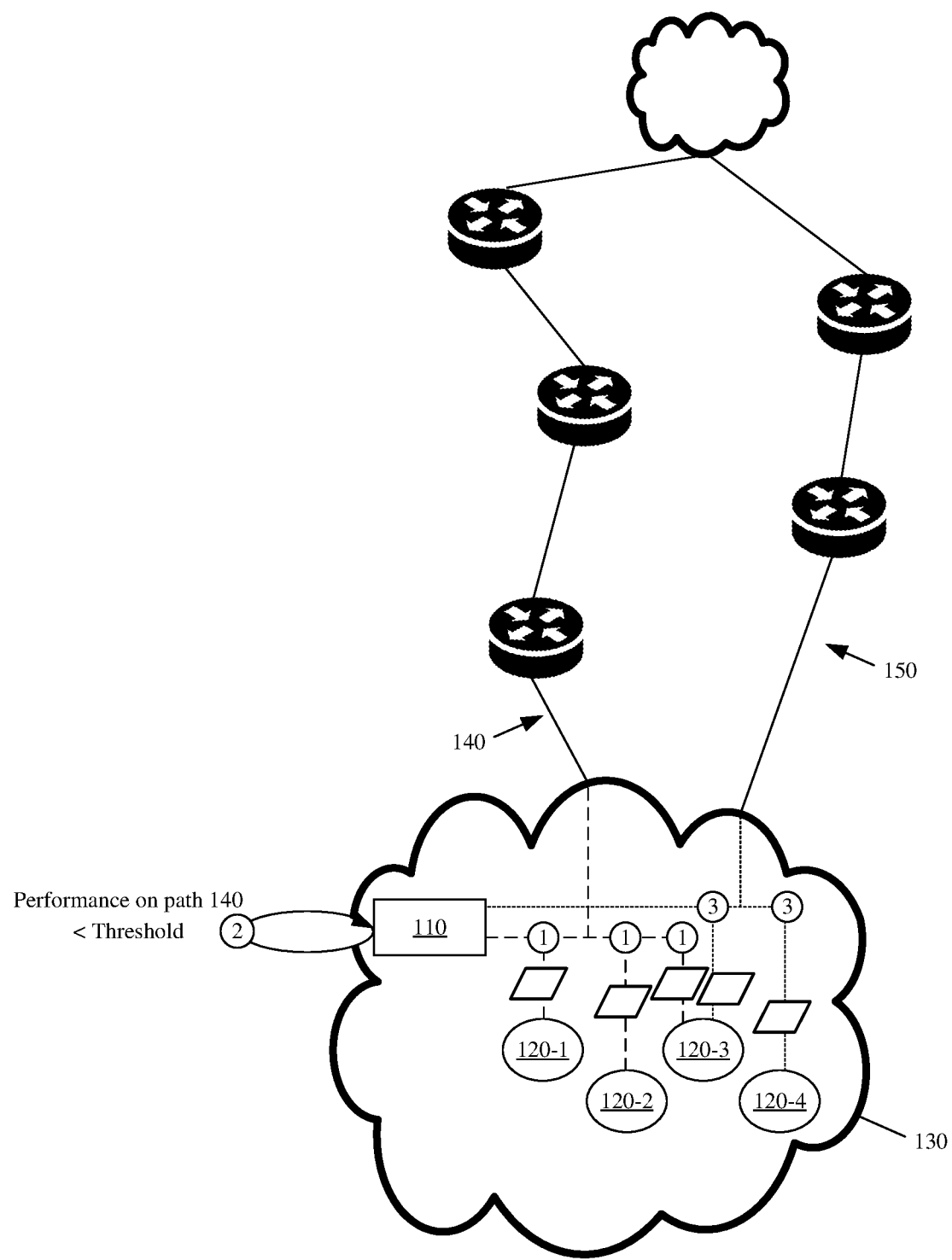
FIG. 1 conceptually illustrates a controller selectively steering egress traffic from different nodes in a distributed platform site across different paths in accordance with some embodiments presented herein.

The following detailed description refers to the accompanying drawings. The same reference numbers in different drawings may identify the same or similar elements.

Disclosed is a controller for dynamically and granularly shifting egress traffic from a particular distributed platform site across different paths based on real-time changes to network and system conditions. Each path may be used to exchange network messaging with one or more destinations using different network links, circuits, systems, and/or devices, and with different performance and cost characteristics associated with each path. The different performance may result from different latency, packet loss, congestion, network failures, routing performance, bandwidth, throughput, and/or factors affecting data transmission through each path. The different costs may result from the transit providers, peers, and/or other operators of the paths charging different rates for traffic passing through the paths, network equipment, and/or links under their control.

The controller may monitor the network and system conditions based on metrics provided by routers and/or nodes operating as part of a particular distributed platform site. In particular, the controller may monitor network-layer and/or application-layer conditions to detect issues that affect the egress traffic flowing through specific paths.

The controller may shift the egress traffic to resolve the detected issues. The traffic shifts may improve performance for all egress traffic by maximizing utilization and performance of the different available paths and/or by ensuring that no single path becomes congested or loses performance as a result of a disproportionate amount of egress traffic being placed on that path. In some embodiments, the controller may shift the egress traffic to resolve network errors affecting one or more paths and/or for cost considerations stemming from different transmission costs associated with the different paths and fees paid by different content providers for the transmission of their traffic from one or more of the distributed platform sites.

The controller may selectively shift egress traffic, that originates from one or more nodes (e.g., servers, hosts, services, etc.) within the particular distributed platform site and/or that is directed to different destinations, across two or more paths that are accessible from the particular distributed platform site. In other words, the nodes may generate the egress traffic and may specify the network addressing for one or more destination that are to receive the traffic, and the controller may override routing policies of border routers in the site to control which of several paths are used to distribute different sets of the egress traffic to the one or more destinations.

In some embodiments, the controller may selectively shift egress traffic by controlling which path is used to transmit the traffic that is generated by each node in a distributed platform site. For instance, the controller may select traffic from a first set of nodes in the distributed platform site to send via a first path, and may select traffic from a second set of nodes in the same distributed platform site to send via a different second path. In some embodiments, the controller may selectively shift egress traffic by controlling which path is used to transmit the traffic that is generated for different destinations by the nodes in the distributed platform site. For instance, the controller may select traffic that is intended for a first destination (e.g., network address, address prefix, subnet, Autonomous System Number (ASN), etc.) and that is generated by a set of nodes in the distributed platform site to send via a first path, and may select traffic that is intended for a different second destination and that is generated by one or more of the same or different nodes from the set of nodes to send via a different second path. After each implemented shift, the controller may track changes to the monitored network and/or system conditions in order to determine if the detected issue has been resolved or if additional traffic shifts are needed to restore a desired level of performance.

FIG. 1 conceptually illustrates controller 110 selectively steering egress traffic from different nodes 120 in distributed platform site 130 across different paths 140 and 150 in accordance with some embodiments presented herein. Distributed platform site 130 may include four nodes 120-1, 120-2, 120-3, and 120-4 (sometimes collectively referred to as "nodes 120" or individually as "node 120").

Nodes 120 may correspond to different devices, machines, servers, and/or server instances that are collocated at site 130 and that distribute different content, services, and/or data in response to received requests. The requests may include HyperText Transfer Protocol ("HTTP") GET messages, other request messages, and/or requests specified using other network protocols. Nodes 120 may run on distinct hardware or may run on shared hardware. Site 130 may correspond to a Content Delivery Network ("CDN") Point-of-Presence ("PoP") or a site of a cloud operator. For instance, site 130 may be a cloud computing cluster, a storage cluster, and/or a caching or proxy site.

Controller 110 may initially steer (at 1) egress traffic that is generated by nodes 120-1, 120-2, and 120-3 to first path 140, and may initially steer (at 1) egress traffic that is generated by node 120-4 to second path 150. As a result of steering the traffic from nodes 120-1, 120-2, and 120-3 to path 140 and the traffic from node 120-4 to path 150, site 130 and/or nodes 120 may provide a particular level of performance that controller 110 controls.

Controller 110 may monitor network and/or system conditions, and may detect (at 2) a change in the network and/or system conditions that indicates an issue affecting path 140. For instance, controller 110 may detect that performance (e.g., latency, packet loss, bandwidth, throughput, etc.) via first path 140 has degraded. The degraded performance may be due to increased congestion, network failures, and/or other reasons.

In response to the change in conditions, controller 110 may shift (at 3) the egress traffic that is generated by node 120-3 from first path 140 to second path 150. The traffic passing on first path 140 is reduced as a result of the shifting (at 3) of the egress traffic.

Controller 110 may obtain a snapshot of the network and/or system conditions after implementing the traffic shift. From the snapshot, controller 110 may determine if the detected issue has been resolved as a result of the shift. For instance, controller 110 may determine if the shift restored performance, cost, and/or other criteria to a desired level.

In this example, controller 110 may determine that shifting the egress traffic of node 120-3 to second path 150 has decreased congestion on first path 140, and that performance on first path 140 has improved to a desired level or threshold. Moreover, the shift may result in improved performance for the egress traffic coming from nodes 120 and/or for the egress traffic flowing across paths 140 and 150.

FIG. 1 illustrates controller 110 steering traffic on an individual node 120 basis. Some embodiments provide controller 110 with additional granular control over the traffic that is to be shifted between paths 140 and 150. In some embodiments, controller 110 may steer traffic across paths 140 and 150 at the network-layer based on destinations targeted in the egress traffic.

Figure 2:
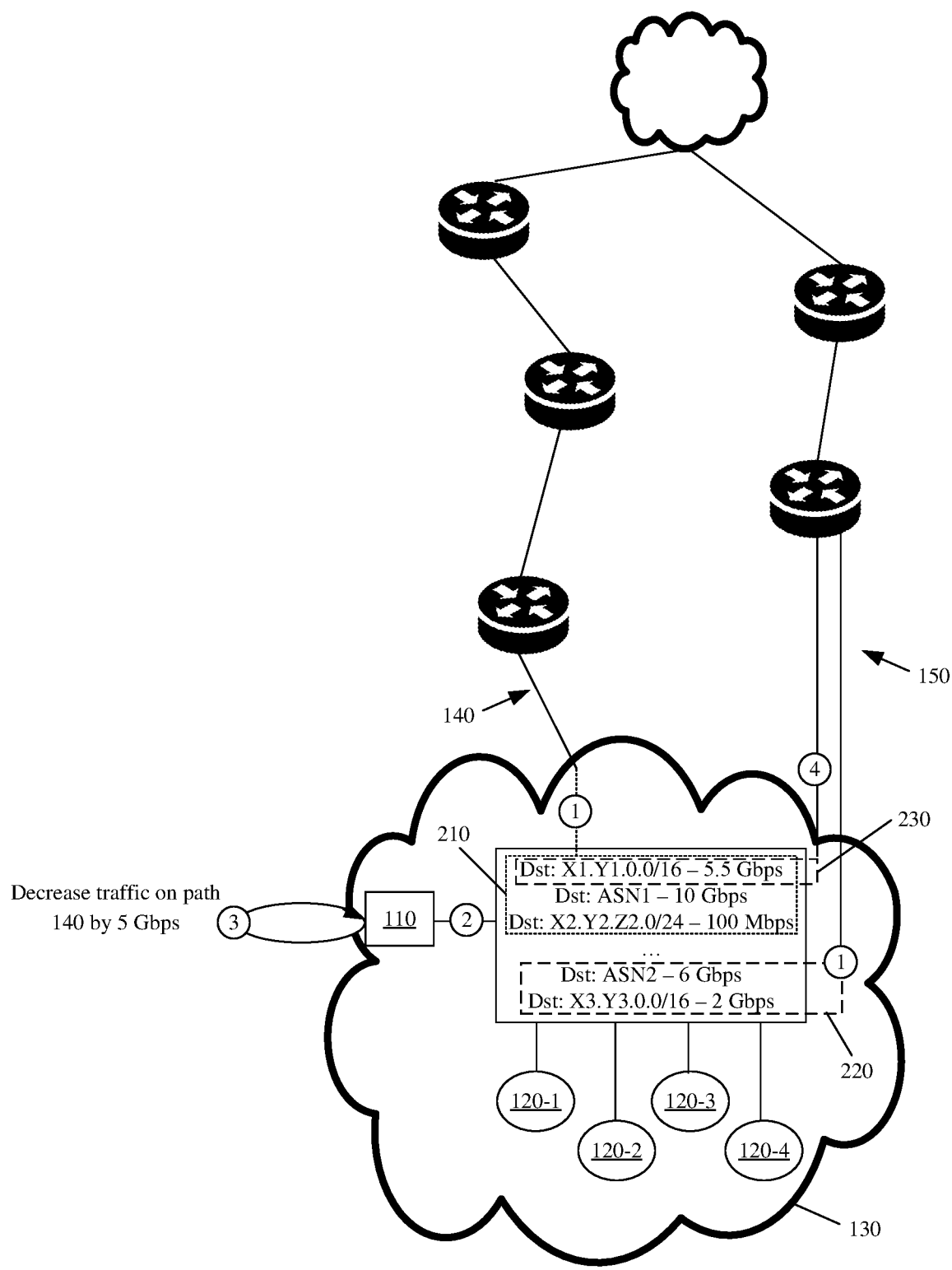
FIG. 2 conceptually illustrates the controller selectively steering egress traffic for different destinations across different paths in accordance with some embodiments presented herein.

FIG. 2 conceptually illustrates controller 110 selectively steering egress traffic for different destinations across different paths 140 and 150 in accordance with some embodiments presented herein. In FIG. 2, controller 110 may target specific destination network addresses, address prefixes, ASNs, and/or other identifiers by which to selectively steer specific traffic that may originate from one or more nodes 120 between paths 140 and 150.

Controller 110 initially steer (at 1) egress traffic directed to a first set of address prefixes and/or a first ASN 210 to path 140, and may steer (at 1) egress traffic directed to a second set of address prefixes and/or a second ASN 220 to path 150. Controller 110 may monitor (at 2) network and/or system conditions resulting from the initial distribution of egress traffic across paths 140 and 150.

Controller 110 may determine (at 3) that the performance provided by the initial distribution does not satisfy a performance threshold, and that shifting 5 gigabits per second ("Gbps") from path 140 to path 150 may optimize utilization, performance, cost, and/or other parameters of paths 140 and 150 to satisfy the performance and/or other thresholds. Controller 110 may determine that 5.5 Gbps of traffic is being sent from site 130 to particular address prefix 230 (e.g., X1.Y1.0.0/16) based on the monitored network and/or system conditions. Accordingly, controller 110 may shift (at 4) the traffic that is directed to particular address prefix 230 from path 140 to path 150 to resolve the detected issue and/or optimize utilization, performance, cost, and/or other parameters of paths 140 and 150.

Figure 3:
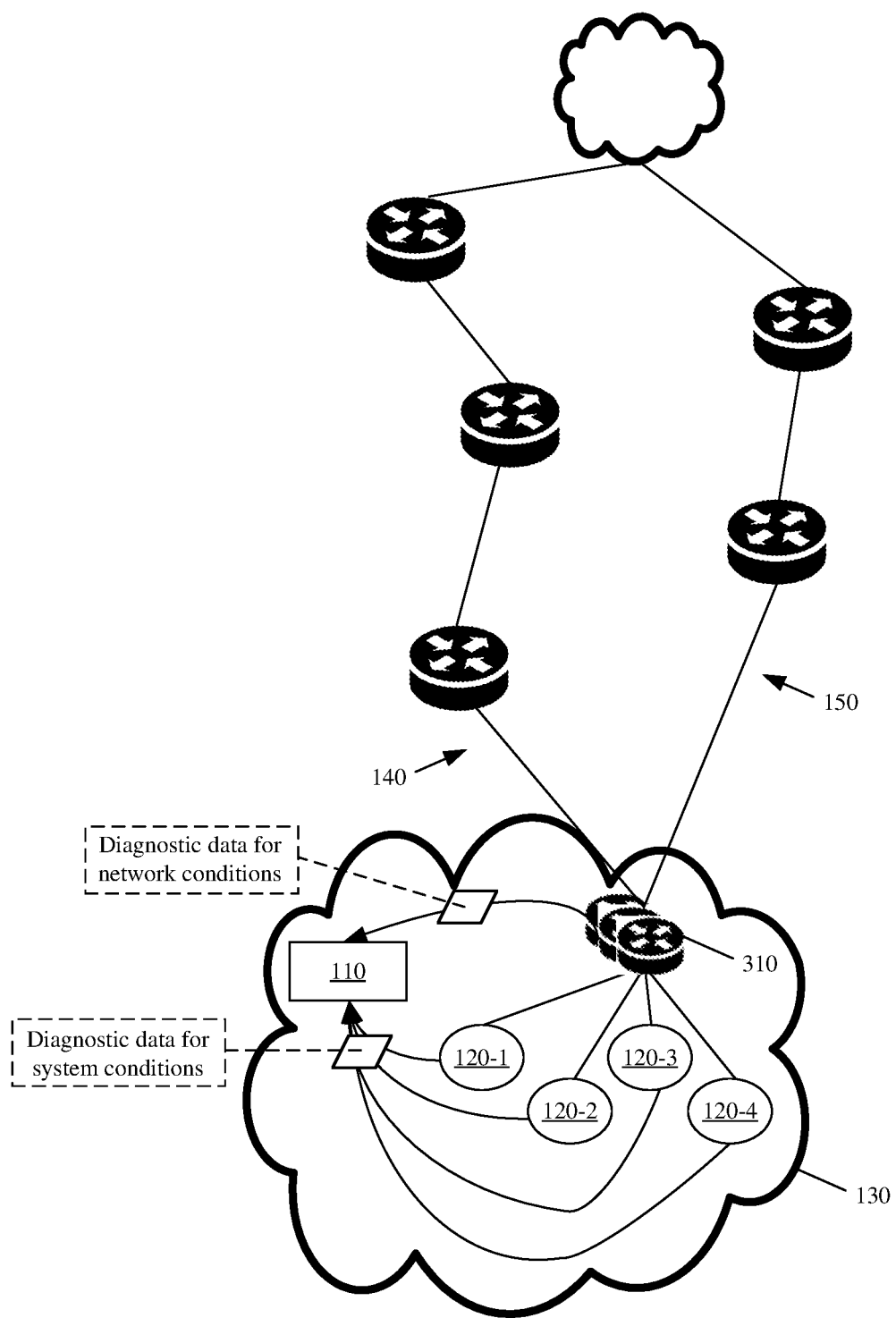
FIG. 3 illustrates an example feedback loop by which the controller obtains network and system conditions for egress traffic steering in accordance with some embodiments presented herein.

FIG. 3 illustrates an example feedback loop by which controller 110 obtains network and system conditions for egress traffic steering in accordance with some embodiments presented herein. FIG. 3 illustrates controller 110 directly or indirectly receiving diagnostic data for system conditions from nodes 120, and directly or indirectly receiving diagnostic data for network conditions from one or more routers 310 of distributed platform site 130.

The system conditions provided by nodes 120 to controller 110 may include application-layer diagnostic data. For example, nodes 120 may provide retransmission data, throughput, health checks, round-trip times ("RTTs"), load, flow data, Simple Network Management Protocol ("SNMP") data, capacity data, performance data, customizable thresholds, and/or other metrics related to the resources, performance, and/or operation of nodes 120.

Routers 310 may route traffic into and out of distributed platform site 130. For instance, routers 310 may pass requests and/or other messages received from external sources (e.g., devices outside of distributed platform site 130) to nodes 120, and may pass egress traffic from nodes 120 to different destinations outside of distributed platform site 130 via available paths (e.g., paths 140 and 150) that connect to the destinations via additional paths, networks, Autonomous Systems ("ASes"), etc.

The network conditions provided by routers 310 to controller 110 may include network-layer diagnostic data. For example, routers 310 may provide netflow data, logs, Border Gateway Protocol ("BGP") monitoring protocol ("BMP") data, streaming telemetry, network performance measurements, circuit costs, configured routes, and/or metrics related to the resources, performance, and/or operation of each path that routers 310 are connected to or that routers 310 exchange traffic with.

In some embodiments, controller 110 may obtain a real-time or essentially real-time feed of the diagnostic data from nodes 120 and/or routers 310. Controller 110 may then track state of each node 120 and/or paths 140 and 150 based on the collected diagnostic data. Tracking the state of each node 120 may include identifying load, performance, utilization, egress traffic, and/or other aspects of each node 120 or node operation. Tracking the state of paths 140 and 150 may include tracking the load, performance, cost, and/or other parameters associated with each path.

Nodes 120 and/or routers 310 may push the diagnostic data to controller 110 as the diagnostic data becomes available or on a periodic basis (e.g., every 5 seconds). Alternatively, controller 110 may pull the diagnostic data from nodes 120 and/or routers 310.

In some embodiments, distributed platform site 130 may include a data broker such as a Kafka broker. Nodes 120 and/or routers 310 may publish diagnostic data to the data broker, and controller 120 may perform a batch retrieval of the diagnostic data from the data broker.

Controller 110 may include a rules engine and/or a recommendation engine to analyze the diagnostic data and to granularly or incrementally shift traffic across the available paths to optimize for performance, cost, and/or other parameters. In particular, the rules engine and/or the recommendation engine may receive the diagnostic data as input, and may determine performance gains and/or cost reductions that may be achieved by shifting different amounts of traffic from one path to another.

The performance gains may correspond to lower latency, lower packet loss, faster RTT, higher throughput, less congestion, and/or other improvements that allow the content and/or data exiting site 130 and/or nodes 120 to reach their intended destination sooner. The cost reductions may involve determining the transmission costs for sending traffic over each of the paths 140 and 150, and minimizing that cost based on the traffic to be served. In some embodiments, the cost reductions may include performance considerations in which certain customers may pay higher fees to ensure a higher level of service for the delivery of their content from site 130, and in these instances, the traffic for these customers may be transmitted over higher cost paths to ensure a higher level of service.

The rules engine and/or the recommendation engine may account for other criteria or considerations besides performance and cost when determining how to shift traffic from site 130. For instance, a contractual obligation may require site 130 to place a certain amount of traffic on a particular path at all times, a peering agreement with a particular transit provider may prioritize paths of that particular transit provider over paths of other transit providers, and/or the network architecture may prioritize paths that connect to a first set of ASes, devices, and/or networks over paths that connect to a different second set of ASes, devices, and/or networks.

The rules engine and/or the recommendation engine may output traffic shift recommendations based on the determined performance gains, cost reductions, and/or other criteria. Controller 110 may implement the traffic shifts, and may alter the egress behavior for the traffic exiting site 130 as a result of implementing the traffic shifts.

In some embodiments, controller 110 may implement the traffic shifts without affecting network layer routing policies via application layer reconfiguration of nodes 120 and/or modifying operation of nodes 120. In some such embodiments, controller 110 may inject and/or modify routes on individual nodes 120, and nodes 120 may modify the packet headers and/or insert additional headers for egress traffic based on the routes so that the egress traffic may include labels and/or other identifiers (in the header) for controlling the path through which the packets will exit site 130.

Controller 110 may be configured with the addressing of each node 120 in site 130. Controller 110 may use the addressing to inject and/or modify routes into a configuration of a particular node 120. The routes provided to the particular node 120 may define a mapping between one or more paths, that controller 110 has selected for the egress traffic of the particular node 120, and corresponding labels or identifiers for directing the egress traffic of the particular node 120 to the one or more paths. The particular node 120 may enter, from the configuration, the label or identifier for a particular path selected by controller 110 into the header of egress traffic. Router 310 may then route the egress traffic through the particular path with the matching label or identifier.

In some embodiments, nodes 120 may execute a BGP daemon and/or run BGP or another exterior gateway protocol to emulate router functionality (e.g., emulate a BGP peer) in addition to running an application-layer (e.g., HTTP) or server process to provide server functionality. In some such embodiments, controller 110 may establish an active BGP session with each node 120 in site 130, and may use the BGP session to inject or modify routes at specific nodes 120. Nodes 120 may modify and/or insert headers for egress traffic packets to include a label or identifier for a path selected by controller 110 based on the BGP session route injections.

Figure 4:
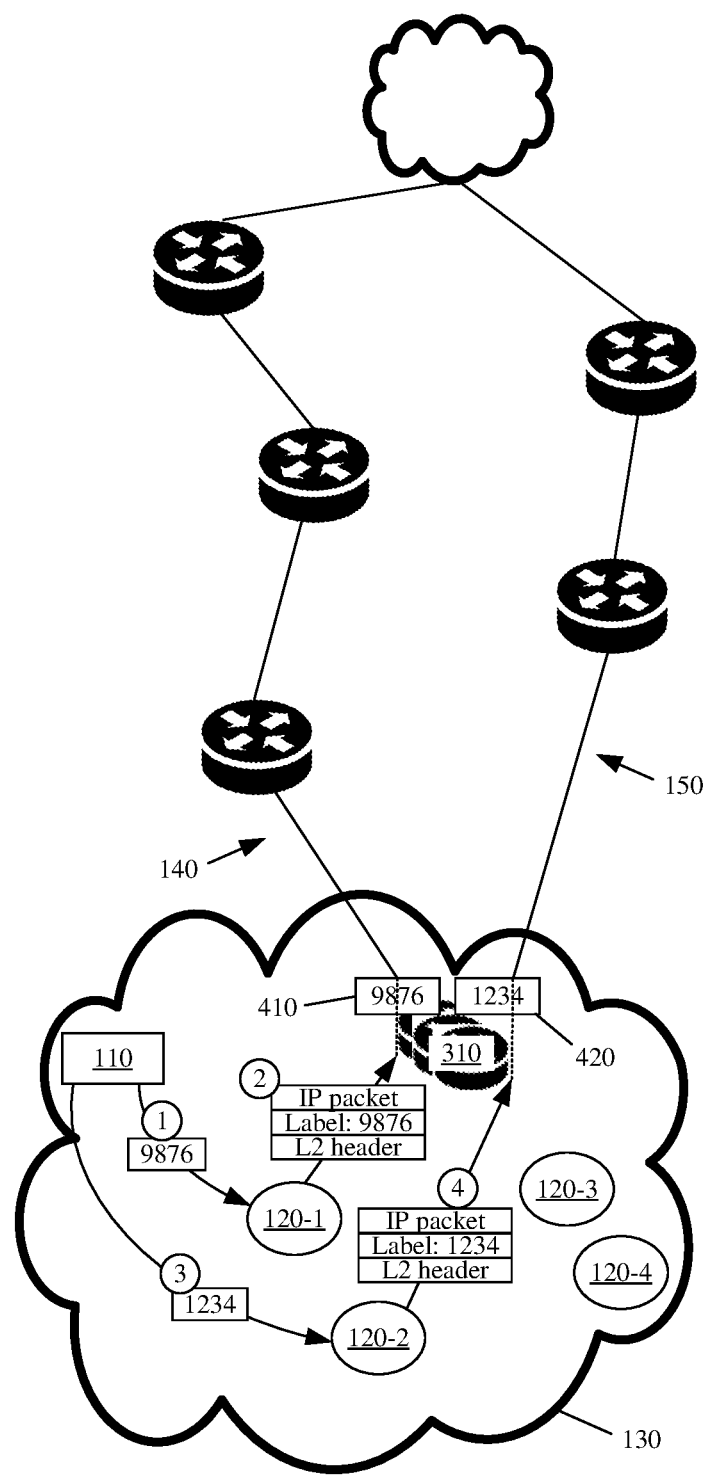
FIG. 4 illustrates the controller implementing traffic shifts by modifying operation of individual nodes to move egress traffic on a node-by-node basis to specified paths in accordance with some embodiments presented herein.

FIG. 4 illustrates controller 110 implementing traffic shifts by modifying operation of individual nodes 120 to move egress traffic on a node-by-node basis to specified paths in accordance with some embodiments presented herein. As shown in FIG. 4, each path 140 and 150 may be accessed using a different label or identifier. Specifically, controller 110 may configure router 310 with first label 410 for path 140 and different second label 420 for path 150. In some embodiments, paths 140 and 150 may be labeled with different Multiprotocol Label Switching ("MPLS") labels.

To steer egress traffic from node 120-1 to path 140, controller 110 may provide (at 1) one or more messages with first label 410 for path 140 to node 120-1, via a route injection or configuration modification, and/or one or more messages that remove other labels from node 120-1 (e.g., second label 420). Node 120-1 may then generate (at 2) egress traffic packets with a header that includes first label 410 for path 140. The egress traffic packets may include a layer-2 header, an MPLS header with first label 410, and an Internet Protocol ("IP") packet. The IP packet may include an IP header specifying a destination address for the packet. In response to receiving the egress traffic labeled with first label 410 from node 120-1, router 310 may reference a routing table to determine that first label 410 is mapped to path 140, and may route the egress traffic from node 120-1 through path 140 based on first label 410 in the egress traffic header. In particular, router 310 may use first label 410 in each received packet as an index to determine the next hop on the label-switched path, wherein the next hop corresponds to a first hop on path 140. Router 310 may be configured as the final link in the label-switched path, and may remove or "pop off" first label 410 and/or the MPLS header from the packets before sending the packets over path 140. The packets may then be routed through the network based on the specified network addressing.

Similarly, to steer egress traffic from node 120-2 to path 150, controller 110 may provide (at 3) one or more messages with second label 420 for path 150 to node 120-2, via a route injection or configuration modification, and/or one or more messages that remove other labels (e.g., first label 410) from node 120-2. Node 120-2 may then generate (at 4) egress traffic packets with a header that includes the second label for path 150. In response to receiving the egress traffic labeled with second label 420 from node 120-2, router 310 may reference a routing table to determine that second label 420 is mapped to path 150, may remove second label 420 from the egress traffic, and may route the egress traffic from node 120-2 through path 150 based on second label 420 in the egress traffic header.

Controller 110 may granularly steer the egress traffic from nodes 120-3, 120-4, and/or other nodes in site 130 by providing nodes 120 with a label or identifier for a path that controller 110 selects for distribution of that node's 120 egress traffic. Nodes 120 will then populate headers of the egress traffic packets based on the provided label or identifier. Accordingly, nodes 120 may be adapted to emulate operation of a router on a label-switched path (e.g., emulate operation of an edge router) while still operating as a server that receives and responds to the application-layer requests by generating the packets for serving content and/or data in response to the requests.

As noted above, controller 110 may perform granular egress traffic shifts. The traffic shifts may be implemented to improve performance, cost, and/or other criteria across the targeted path or nodes 120. For instance, all egress traffic from site 130 may initially pass through path 140. Controller 110 may determine from the collected diagnostic data that performance on path 140 begins to degrade or fall below a threshold level of performance as a result of congestion, network failures, limited throughput, and/or other reasons, and may initially shift the egress traffic that is generated by node 120-2 from path 140 to path 150 as demonstrated in FIG. 4. Controller 110 may monitor the diagnostic data that is produced and/or collected after the initial shift to determine if the initial shift of traffic from node 120-2 to path 150 improved performance on paths 140 and 150 and/or for nodes 120 of site 130. In other words, controller 110 may take a snapshot of performance before and after each incremental shift to determine if overall performance for egress traffic of site 130 or performance on path 140 improved to a desired level and/or above the threshold level of performance.

Figure 5:
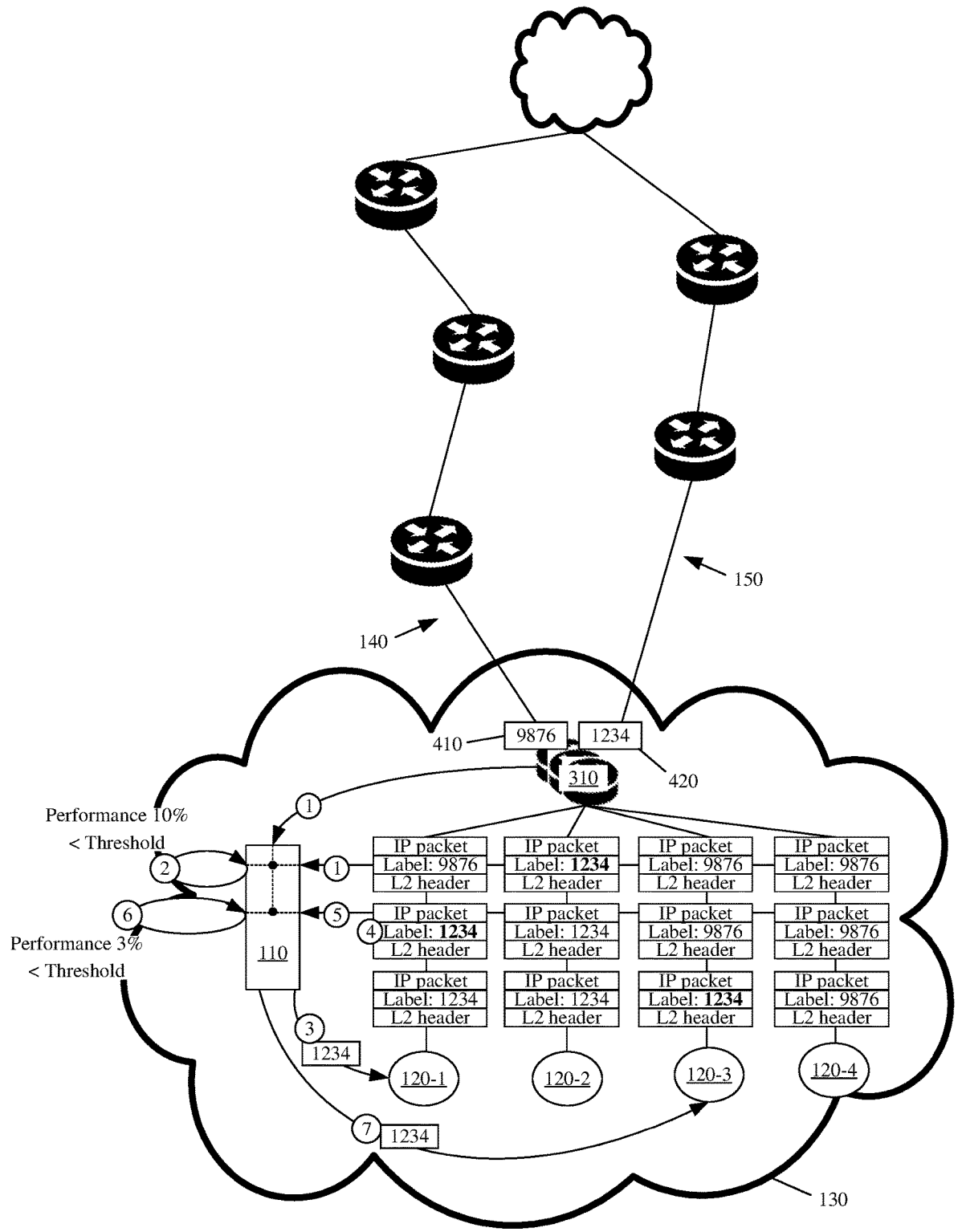
FIG. 5 illustrates the controller granularly shifting traffic between different paths on a per node basis in accordance with some embodiments presented herein.

FIG. 5 illustrates controller 110 granularly shifting traffic between paths 140 and 150 on a per node basis in accordance with some embodiments presented herein. As shown in FIG. 5, controller 110 may obtain (at 1) a snapshot of performance after shifting traffic of node 120-2 from path 140 to path 150 and retaining traffic of nodes 120-1, 120-3, and 120-4 on path 140. Controller 110 may determine (at 2), that although performance improved, the performance gains did not produce a desired level of performance.

Controller 110 may perform (at 3) a route injection to modify operation of node 120-1. Controller 110 may provide (at 3) second label 420 for path 150 to node 120-1, and/or remove first label 410 for path 140 from node 120-1. As a result of the route injection, node 120-1 may generate (at 4) egress traffic packets that include second label 420 instead of first label 410. The packets may arrive at router 310, and router 310 may distribute the packets from node 120-1 to path 150 based on second label 420 that is inserted into the packet headers by node 120-1.

As a result of the actions illustrated in FIGS. 4 and 5, controller 110 may initially shift traffic of node 120-2 from path 140 to path 150, and may supplement the shift by shifting traffic of node 120-1 from path 140 to path 150. Controller 110 may obtain (at 5) a snapshot of performance after the second shift (e.g., shifting traffic of node 120-1 from path 140 to path 150) by collecting the diagnostic data for the network and/or system conditions from routers 310 and/or nodes 120. Controller 110 may determine (at 6), based on the snapshot, if the additional shift of egress traffic from node 120-1 away from path 140 to path 150 results in a desired level of performance.

In response to determining that the threshold level of performance has been reached, controller 110 may continue monitoring the network and system conditions to identify further disruptions that may necessitate different traffic shifts. As shown in FIG. 5, controller 110 may determine (at 6) that performance at site 130 remains below a threshold because of site 140. Accordingly, controller 110 may continue with the incremental traffic shifting by selecting additional nodes 120 in site 130 with egress traffic that can be shifted away from path 140 and onto other paths (e.g., path 150). For instance, as shown in FIG. 5, controller 110 may select node 120-3 as a next node with egress traffic to move from path 140 over to path 150. Accordingly, controller 110 may perform (at 7) a route injection that provides node 120-3 with second label 420 for path 150 and/or that removes first label 410 for path 140 from a routing mapping and/or configuration of node 120-3. A subsequent snapshot of the diagnostic data may indicate that the shifting of egress traffic from nodes 120-1, 120-2, and 120-3 to path 150 was successful in resolving the issue and/or restoring performance to the desired threshold level of performance.

Controller 110 may select nodes 120 for the granular traffic shifts deterministically or non-deterministically. For instance, the diagnostic data for system conditions obtained by controller 110 may include statistics about performance and/or resource utilization at each node 120. Based on this diagnostic data, controller 110 may deterministically select nodes 120 with the greatest load or demand to shift from an underperforming path to a higher performing path. Alternatively, controller 110 may deterministically select nodes 120 that host and/or serve high priority content to shift from an underperforming path to a higher performing path. In this manner, controller 110 may target specific nodes 120 and/or specific traffic to shift between different paths 140 and 150. In some embodiments, controller 110 may implement a non-deterministic shifting of nodes 120 between paths 140 and 150. For instance, controller 110 may perform a round-robin selection of nodes 120 as part of staggering the shift of egress traffic from different nodes 120 to different paths 140 and 150.

Figure 6:
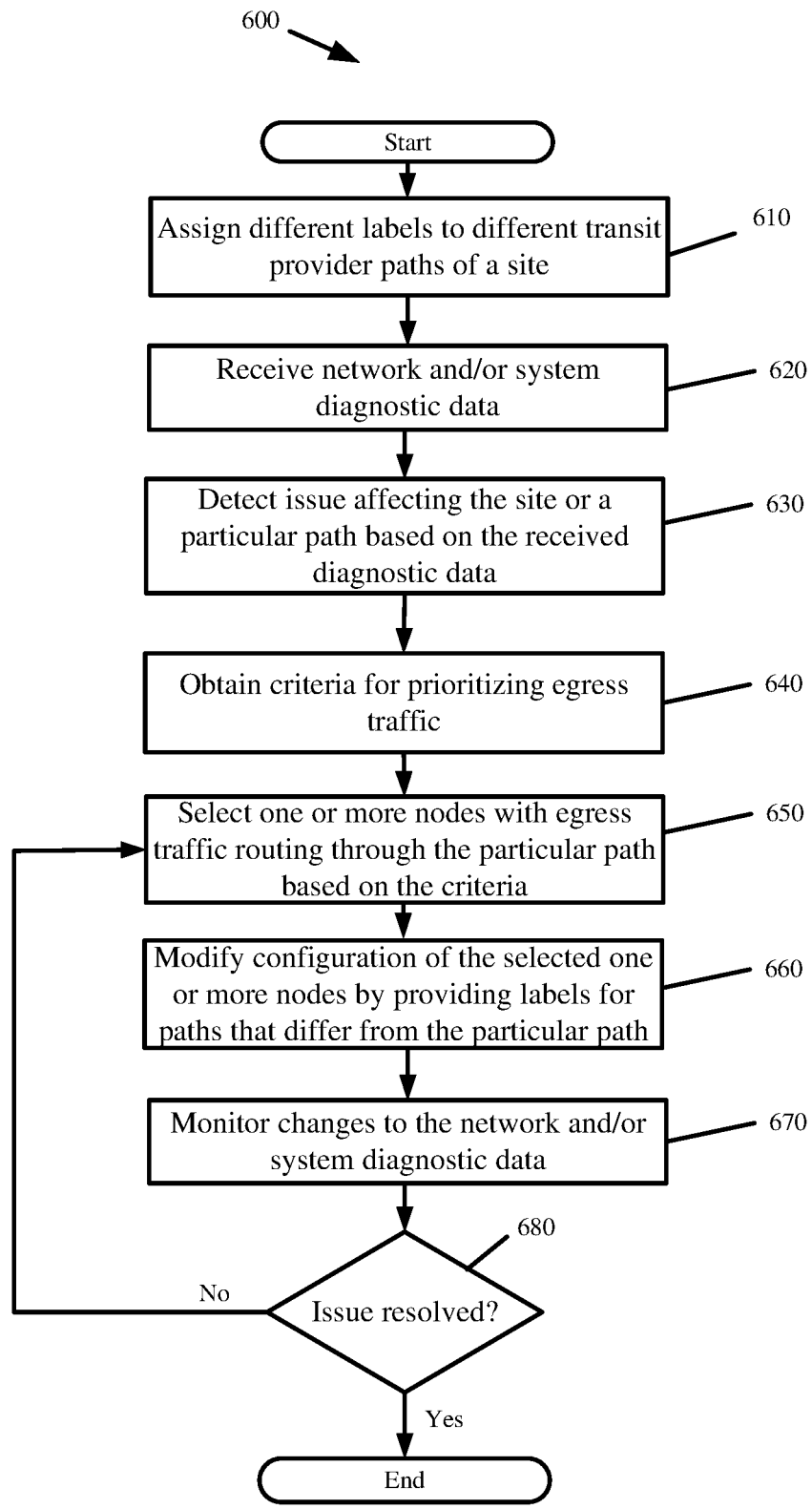
FIG. 6 presents a process for the staggered shifting of traffic from nodes in a particular site in accordance with some embodiments presented herein.

FIG. 6 presents a process 600 for the staggered shifting of traffic from nodes 120 in a particular site 130 in accordance with some embodiments presented herein. Process 600 may be performed by controller 110 that is located in and/or operates from the same particular site 130 as nodes 120.

Process 600 may include assigning (at 610) different labels to different egress paths from site 130. The labels may be MPLS labels or identifiers of other routing techniques or protocols for steering traffic at a layer below the network layer (e.g., without changing IP addressing of the packets). The assignment (at 610) of different labels may include configuring router 310 of site 130 with the label for each egress path, wherein router 310 may be a label edge router, egress router, and/or a router that receives incoming traffic for nodes 120 of site 130 and/or that routes egress traffic from nodes 120 to destinations that are outside or remote from site 130 (e.g., destinations in external networks). In some embodiments, the configuration of router 310 may include defining an entry in a routing table of router 310 that maps a particular label to the network address of a first hop in the path identified by the particular label. The assignment (at 610) may also include updating an internal table of controller 110 with each label-to-path mapping.

Process 600 may include receiving (at 620) diagnostic data for network and/or system conditions. The network diagnostic data may be collected from router 310, network equipment operating at the network layer, and/or network equipment that monitor and provide data about the different paths. The system diagnostic data may be collected from nodes 120 and/or other devices in site 130 that respond to requests and/or generate the egress traffic exiting site 130. The system diagnostic data may provide information about the operation of nodes 120 (e.g., resource utilization, throughput, cache, etc.) and/or the content being served by nodes 120.

Process 600 may include detecting (at 630) an issue affecting site 130 or a particular path based on the received (at 620) diagnostic data. Controller 110 may detect (at 630) the issue by comparing snapshots of the diagnostic data at different times, and identifying deviations in performance, cost, and/or other criteria. For instance, controller 110 may detect (at 630) that performance along the particular path does not satisfy a performance threshold, or may detect (at 630) that capacity utilization at site 130 exceeds a capacity threshold.

Process 600 may include implementing a staggered shift of traffic from the particular path to other paths. Implementing the staggered shift may include obtaining (at 640) criteria for prioritizing the egress traffic that routes through the particular path based on diagnostic data of nodes 120, the type of content, the content provider, and/or the destinations for the content. Implementing the staggered shift may further include selecting (at 650) one or more nodes 120 with egress traffic currently routing through the particular path based on the criteria. For instance, controller 110 may deterministically select nodes 120 providing system data that satisfies certain thresholds (e.g., load, type of content being served, throughput, available resources, etc.). In some embodiments, the selection (at 650) may be made non-deterministically.

Process 600 may include modifying (at 660) the configuration of the selected one or more nodes 120 by providing the one or more nodes 120 with the labels for one or more paths, that are different than the particular path, to receive some or all of the egress traffic from the one or more nodes 120. Modifying (at 660) the configuration may further include linking the labels to different types of egress traffic flowing from each of nodes 120. For instance, nodes 120 may implement a per-flow labeling of the egress traffic in which egress traffic of a first type from a particular node 120 may be labeled with a first label, and egress traffic of a second type form the particular node 120 may be labeled with a different second label. In some embodiments, modifying (at 660) the configuration may include modifying a routing table, BGP forwarding table, and/or other mapping table that the one or more nodes 120 use to generate headers and/or address egress packets. More specifically, modifying (at 660) the configuration may include injecting a new route with the labels for the one or more alternative paths and/or removing an existing entry or label to the particular path from the configuration of the one or more nodes 120.

Process 600 may include monitoring (at 670) changes to the network and/or system diagnostic data after modifying (at 660) the configuration of the one or more nodes 120, and determining (at 680) if the issue affecting the particular path has been resolved based on the changes to the network and/or system diagnostic data. For instance, controller 110 may determine (at 680) if performance on the particular path has improved past a threshold, or if overall performance for the egress traffic exiting site 130 has improved past a threshold.

In response to determining (at 680—Yes) resolution of the issue, process 600 may end or continue by monitoring the diagnostic data for other issues affecting other paths. In response to determining (at 680—No) that the issue persists, process 600 may incrementally shift more egress traffic from the particular path to the alternative paths. To do so, process 600 may select (at 650) additional nodes, and may modify (at 660) the configuration (e.g., label-to-path mapping table) of the additional nodes in order to shift egress traffic of the additional nodes from the particular path to one or more alternate paths.

In some embodiments, nodes 120 may impose some control over the shifting of egress traffic generated by those nodes 120 across paths provided by controller 110 via the route injections or configuration changes. For instance, controller 110 may be programmed with a first set of policies that the rules engine and/or the recommendation engine use to identify issues affecting performance, cost, and/or other criteria of a set of paths, and to determine traffic shifts to ameliorate the identified issues. Nodes 120 may be programmed with a different set of policies for selecting which traffic to shift across paths that controller 110 makes accessible via the route injections. In other words, if controller 110 configures only a single path for a node 120 to use, then all egress traffic from that node 120 will route through that single path. However, if controller 110 configures two or more paths for a node 120 to use, then node 120 can selectively distribute its egress traffic between the two or more paths based on policies enforced by the node 120.

Figure 7:
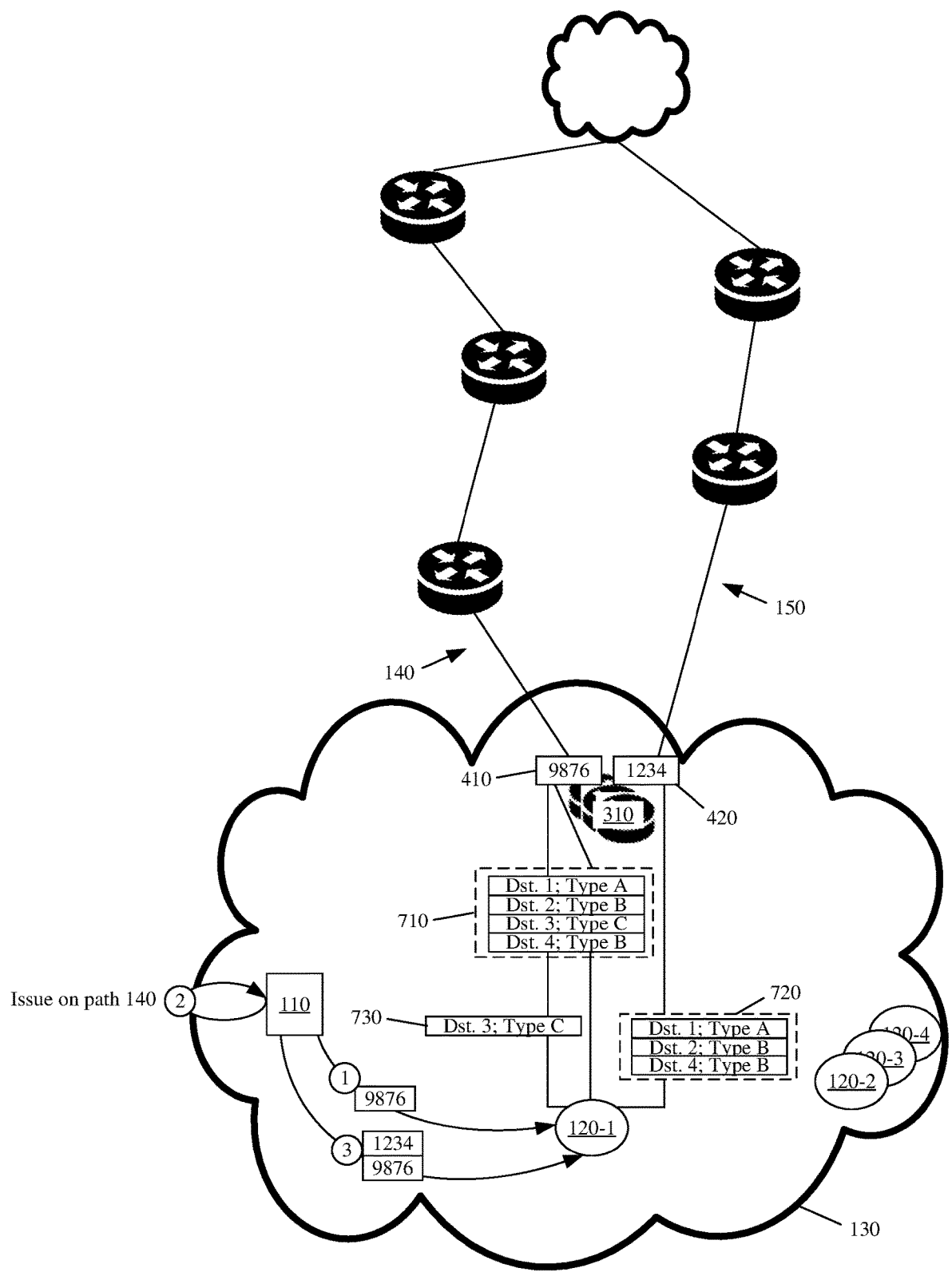
FIG. 7 illustrates the policy-based traffic shifting that is implemented by a node in accordance with some embodiments presented herein.

FIG. 7 illustrates the policy-based traffic shifting that is implemented by node 120-1 in accordance with some embodiments presented herein. In this figure, controller 110 may initially configure (at 1) node 120-1 with first label 410 for path 140. As a result, egress traffic 710, that is generated by node 120-1 during a first time when node 120-1 is configured with first label 410, may include first label 410 and may route through path 140.

Controller 110 may detect (at 2) an issue that affects path 140, and may select node 120-1 as one or more nodes whose traffic is to be shifted from path 140 to path 150. To implement the shift, controller 110 may provide (at 3) second label 420 for path 150 to node 120-1, thereby creating an alternative path that node 120-1 may use for distribution of its egress traffic from site 130. In some embodiments, controller 110 may provide (at 3) second label 420 with a higher precedence than first label 410 to signal to node 120-1 that path 150 is better performing or for high priority content and that path 140 is worse performing or for low priority content. In some embodiments, node 120-1 may measure performance of each path after receiving a path or configuration update from controller 110, and may determine path 150 to be faster performing than path 140 based on the measurements.

Node 120-1 may retain first label 410 and second label 420 after the traffic shift implemented (at 3) by controller 110. Node 120-1 may use one or more policies to select between paths 140 and 150 for different egress traffic that is generated by node 120-1 during a second time after the traffic shift that provides node 120-1 access to paths 140 and 150. For instance, node 120-1 may include a policy for identifying first set of content 720 from egress traffic 710 as high priority or latency sensitive content, may label packets of first set of content 720 with second label 420 for prioritized path 150, and may label packets of different second set of content 730 from egress traffic 710 with first label 410 for low priority path 140. In doing so, node 120-1 may prioritize the distribution of first set of content 720 over second set of content 730 by using second label 420 to distribute first set of content 720 (e.g., high priority or latency sensitive content) through faster performing path 150, and by using first label 410 to distribute second set of content 730 (e.g., low priority or latency insensitive content) through slower performing path 140.

In some embodiments, node 120-1 may prioritize the distribution of content of specific types (e.g., streaming media, real-time communications, etc.), low latency services, content of premium customers, high demand content, and/or other content, services, and/or data that is determined to be of high value or latency sensitive over path 150, while other content, services, and/or data may be distributed over path 140. In some such embodiments, node 120-1 may perform insert different labels into the headers of packets for the different content types. In some embodiments, node 120-1 may prioritize the distribution of content addressed to a particular address prefix, subnet, ASN, peer, and/or other destinations that are determined to receive a higher quality of service or to be latency sensitive over faster performing path 150, while other content, services, and/or data for other destinations may be distributed over slower performing path 140. In some embodiments, node 120-1 may differentiate first set of content 720 from second set of content 730 (e.g., high priority content from low priority content) based on Uniform Resource Locator ("URL") parameters, domain names, file names, file extensions, port numbers, network addressing, header parameters, and/or other attributes associated with the content.

It should be noted that controller 110 may override the ability of a node 120 to distribute egress traffic over different paths by configuring that node 120 with the label of a single path. In other words, controller 110 may force the shift of all traffic of node 120-1 from path 140 to path 150 by injecting second label 420 for path 150 and by removing first label 410 for path 140 from node 120-1 when implementing the traffic shift.

In addition to or instead of implementing the traffic shifts by modifying operation of nodes 120, controller 110 may implement traffic shifts at the network layer by modifying routing policies of router 310. For instance, controller 110 may reconfigure router 310, and more specifically, may modify BGP entries and/or routing policies used by router 310 to control traffic distribution across paths 140 and 150.

Implementing the traffic shifts at the network layer and/or at router 310 may provide different control over the traffic being shifted between different paths. For instance, rather than shift traffic on a node-by-node basis, the traffic shifts at the network layer may allow controller 110 to steer egress traffic based on ASNs, address prefixes, subnets, and/or other network layer routing parameters.

Controller 110 may implement the traffic shifts at router 310 based on the same or different criteria used to implement the traffic shifts with nodes 120. For instance, controller 110 may a change in performance, cost, or other criteria of path 140, and may shift egress traffic directed to addressing within an ASN, address prefix, and/or subnet from path 140 to path 150. In some embodiments, controller 110 may prioritize shifts that minimize the number of changes to router 310 and/or affected customers, content, networks, etc. For instance, controller 110 may prioritize shifting egress traffic directed to one ASN over multiple subnets in order to minimize the number of changes to router 310.

In some embodiments, controller 110 may weigh different network and/or system diagnostic data differently to select the egress traffic shifts that yield desired improvements or results with respect to path performance, cost, and/or other criteria. The recommendation engine of controller may produce different scores for shifting different AS numbers, address prefixes, subnets, and/or routing parameters based on the different weighting. In some embodiments, the highest scores may be attributed to traffic shifts that produce a desired result (e.g., shifting a particular amount of traffic or produce a desired performance) with the least impact to router 310, site 130, and/or the network. The recommendation engine may generate routes or policy changes that resolve an issue on a particular path based on the resulting scores, and controller 110 may implement the traffic shift in resolution of the issue by injecting the routes or incorporating the policy changes at router 310.

Figure 8:
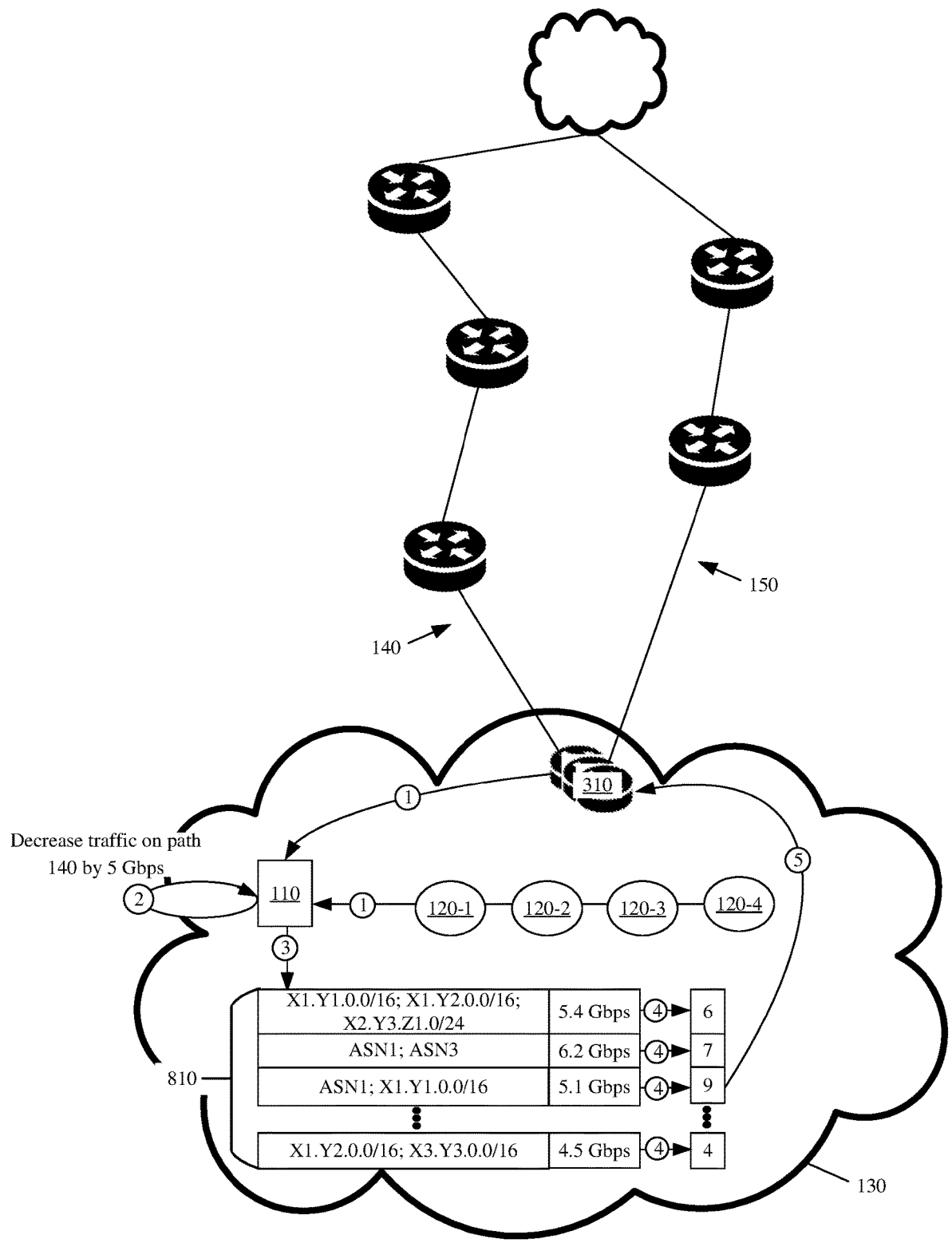
FIG. 8 illustrates an example of the controller implementing a traffic shift via changes to a router in a site in accordance with some embodiments presented herein.

FIG. 8 illustrates an example of controller 110 implementing a traffic shift via changes to router 310 in site 130 in accordance with some embodiments presented herein. Controller 110 may receive (at 1) diagnostic data for network and/or system conditions from router 310 and/or nodes 120 in site 130. Controller 110 may detect, based on the diagnostic data, that performance on path 140 is below a threshold, and may determine (at 2) that shifting 5 Gbps of traffic from path 140 to path 150 may remedy the performance issues on path 140.

From the diagnostic data, controller 110 may identify (at 3) potential traffic shifts 810 based on different combinations of ASNs, address prefixes, subnets, and/or other network layer parameters from the egress traffic exiting site 130 on path 140 that approximately total the desired 5 Gbps of traffic to shift away from path 140. Each potential traffic shift 810 may correspond to a different reconfiguration and/or route injection that controller 110 may provide to router 310 in order to achieve the desired traffic shift.

Controller 110 may score (at 4) each potential traffic shift 810 according to a set of defined criteria. The criteria may account for the number of changes to router 310 and/or the number of customers, content, networks, etc. that will be affected by each potential traffic shift 810. The criteria may account for the amount by which the total traffic associated with each potential traffic shift 810 deviates from (e.g., is more or less than) the desired amount of traffic to shift (e.g., 5 Gbps). In some embodiments, the criteria may account for ASNs, address prefixes, subnets, and/or other network layer parameters that are prioritized over others due to peering relationships, contractual agreements, geographic proximity, etc. As shown, potential traffic shifts 810 that move more or less than the 5 Gbps are scored lower as are traffic shifts that involve egress traffic to multiple AS numbers, address prefixes, subnets, and/or other network layer routing parameters.

Controller 110 may implement (at 5) the traffic shift with the highest score. In this example, potential traffic shift 810 with the highest score corresponds to a particular ASN and address prefix combination that receives about 5 Gbps of egress traffic from site 130. Accordingly, controller 110 may provide (at 5) one or more messages to router 310 that modify the routing policy of router 310. In response to the modification, router 310 may route egress traffic targeting the particular ASN and address prefix combination through path 150 instead of path 140. Specifically, if router 310 receives an egress traffic packet with a destination address that falls within the particular ASN and address prefix combination, router 310 will route that egress traffic packet to a next hop on path 150.

Controller 110 may continue to monitor the diagnostic data for the network and/or system conditions, and may obtain a snapshot of the diagnostic data to determine if the implemented traffic shift resolve the issue (e.g., the performance on path 140 satisfies the threshold). In response to determining that the issue persists, controller 110 may gradually shift more traffic away from path 140 by determining a new amount of traffic to shift away from path 140, identifying additional potential traffic shifts for shifting the new amount of traffic, scoring the potential traffic shifts, and implement the potential traffic shift that is determined to shift the desired amount of traffic with the least impact.

The identification of the potential traffic shifts and scoring of the traffic shifts may also be used when implementing traffic shifts on a node-by-node basis as described above. For instance, controller 110 may score each node 120 before selecting nodes with egress traffic to shift from one path to another. In this case, nodes 120 may be scored based on resource utilization, load, requested content, and/or other system conditions that controller 110 obtains for each node.

In some embodiments, controller 110 may be a tool that a network administrator may use to manage their network. For instance, the network administrator may provide input to controller 110 that specifies an amount of traffic the network administrator wants to shift away from a particular path. In response to the input, controller 110 may identify the potential traffic shifts to produce the desired shift of traffic away from the particular path, may score each potential traffic shift based on a specified set of criteria, and may provide a particular potential traffic shift with the highest score to the network administrator. The network administrator may authorize the particular potential traffic shift, and controller 110 may modify operation of router 310 to implement the particular potential traffic shift without the network administrator having to manually access router 310 in order to implement the changes.

In some embodiments, controller 110 may communicate with other controllers 110 at other sites of a distributed platform. The controllers 110 may coordinate traffic shifts to ensure that a shift implemented at one site 130 by one controller 110 does not affect or cause traffic shifts at other sites 130. Controller 110 may communicate with another in a distributed fashion or in a centralized fashion in which a centralized controller 110 may communicate with and/or coordinate traffic shifts implemented by local controllers 110 at a respective site 130 in which that controller 110 operates.

Figure 9:
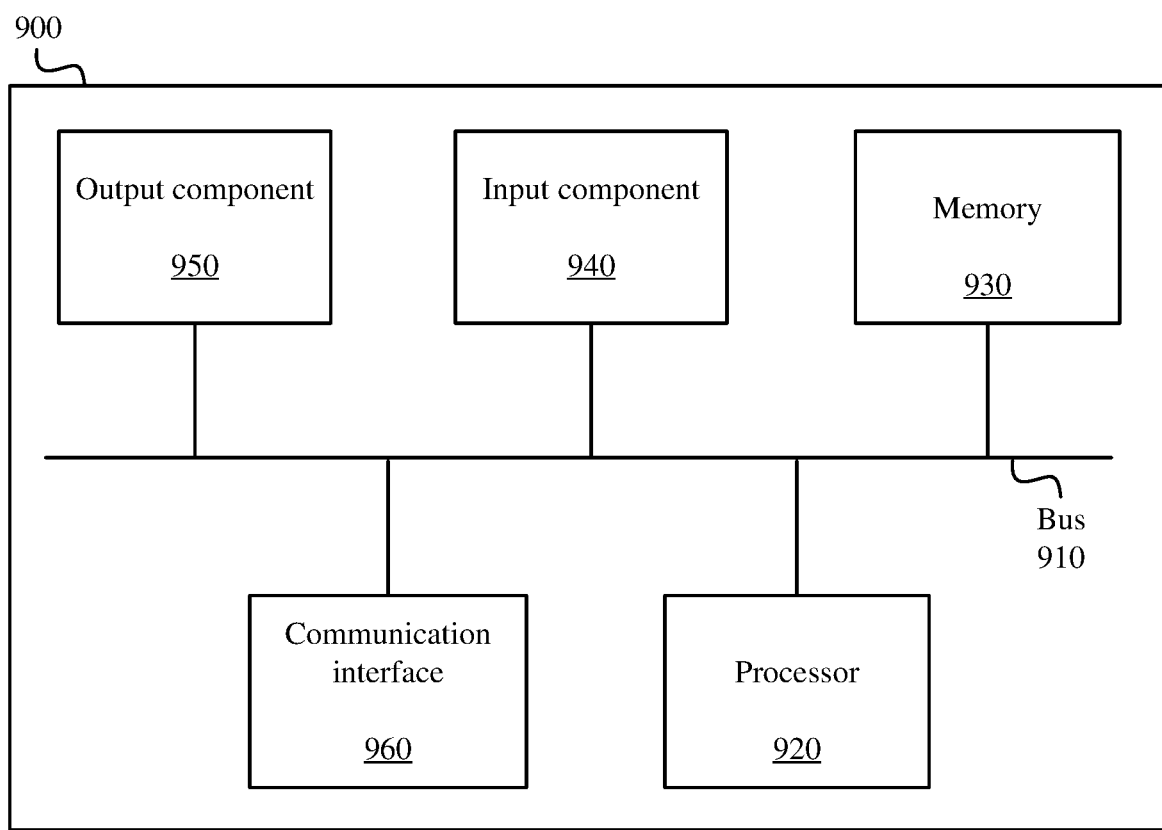
FIG. 9 illustrates example components of one or more devices, according to one or more embodiments described herein.

FIG. 9 is a diagram of example components of device 900. Device 900 may be used to implement one or more of the devices or systems described above (e.g., controller 110, nodes 120, router 310, etc.). Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
  monitoring a plurality of paths from which egress traffic, that is generated by a plurality of nodes operating in a common site, traverses a network, wherein said monitoring comprises tracking a first set of the egress traffic that routes across a first path of the plurality of paths based on a first header value;
  defining a policy that shifts a portion of the first set of egress traffic from the first path to at least one other path of the plurality of paths;
  selecting a first set of the plurality of nodes that generates the first set of the egress traffic routing through the first path, wherein the first set of nodes comprises one or more of the plurality of nodes;
  shifting the portion of the first set of egress traffic from the first path to a second path of the plurality of paths by configuring the first set of nodes with the policy and a second header value in addition to the first header value, wherein the second header value is used to route traffic through the second path, and wherein the first set of nodes label a first subset of the first set of egress traffic with the first header value, and label a second subset of the first set of egress traffic with the second header value according to the policy and a configuration of the first set of nodes comprising the first header value and the second header value;
  determining, after said shifting, that performance of the common site or the first path does not satisfy a threshold;
  selecting a different second set of the plurality of nodes that generates a second set of the egress traffic routing through the first path; and
  shifting the second set of the egress traffic from the first path to the second path by configuring the second set of nodes with the policy and the second header value in addition to the first header value.

2. The method of claim 1 further comprising:
  identifying a first potential shift of the second set of the egress traffic that routes through the first path and that is directed to a first set of destinations, and a second potential shift of a third set of the egress traffic that routes through the first path and that is directed to a second set of destinations; and
  implementing the first potential shift instead of the second potential shift in response to the first potential shift implementing with fewer changes to the policy, wherein implementing the first potential shift comprises moving the second set of egress traffic from the first path to the second path.

3. The method of claim 2 further comprising:
  determining a threshold amount of the egress traffic to steer away from the first path; and
  wherein implementing the first potential shift is further in response to the second set of egress traffic being closer to the threshold amount than the third set of egress traffic.

4. The method of claim 2, wherein implementing the first potential shift comprises:
  determining that the second set of egress traffic involves a fewer number of Autonomous System Numbers ("ASNs") or address prefixes than the third set of egress traffic.

5. The method of claim 4 further comprising:
  scoring the first potential shift higher than the second potential shift based on said determining that the second set of egress traffic involves fewer ASNs or address prefixes; and
  selecting the first potential shift over the second potential shift for implementation based on said scoring.

6. The method of claim 1 further comprising:
  configuring a router of the common site with a different header value for each path of the plurality of paths.

7. The method of claim 6, wherein each header value is a different Multiprotocol Label Switching ("MPLS") label.

8. The method of claim 1 further comprising:
  determining resource utilization on each of the plurality of nodes; and wherein selecting the first set of nodes comprises selecting one or more nodes from the plurality of nodes based on the resource utilization.

9. The method of claim 1,
wherein each node of the plurality nodes executes a server process that provides content in response to user requests for the content, and further executes a router process; and
wherein said shifting the portion of the first set of egress traffic comprises performing a route injection via a Border Gateway Protocol ("BGP") session that is established with the router process of each node of the first set of nodes.

10. The method of claim 1 further comprising:
obtaining criteria that prioritizes the plurality of nodes based on one or more of node performance and content being served from each node; and
wherein said selecting the first set of nodes is based on the criteria.

11. The method of claim 1, wherein said shifting the portion of the first set of egress traffic comprises:
generating, by the first set of nodes, a first subset of the first set of egress traffic for a first set of content with the second header value in response to the policy prioritizing the first set of content over a second set of content; and
generating, by the first set of nodes, a second subset of the first set of egress traffic for the second set of content with the first header value in response to the policy prioritizing the first set of content over the second set of content.

12. A method comprising:
monitoring a plurality of paths from which egress traffic, that is generated by a plurality of nodes operating in a common site, traverses a network;
determining an issue affecting a first path of the plurality of paths based on said monitoring;
identifying a first potential shift of a first set of the egress traffic that routes through the first path and that is directed to a first set of destinations, and a second potential shift of a second set of the egress traffic that routes through the first path and that is directed to a second set of destinations; and
implementing the first potential shift instead of the second potential shift in response to the first potential shift implementing with fewer changes to at least one routing policy, that controls the distribution of the egress traffic across the plurality of paths, than the second potential shift, wherein implementing the first potential shift comprises moving the first set of egress traffic from the first path to at least a second path of the plurality of paths.

13. The method of claim 12 further comprising:
determining a threshold amount of the egress traffic to steer away from the first path in resolution of the issue; and
wherein implementing the first potential shift is further in response to the first set of egress traffic being closer to the threshold amount than the second set of egress traffic.

14. The method of claim 12 further comprising:
determining that the first set of egress traffic involves a fewer number of Autonomous System Numbers ("ASNs") or address prefixes than the second set of egress traffic.

15. The method of claim 14 further comprising:
scoring the first potential shift higher than the second potential shift based on said determining that the first set of egress traffic involves fewer ASNs or address prefixes; and
selecting the first potential shift over the second potential shift for implementation based on said scoring.

16. A device comprising:
one or more processors configured to:
monitor a plurality of paths from which egress traffic, that is generated by a plurality of nodes operating in a common site, traverses a network, wherein said monitoring comprises tracking a first set of the egress traffic that routes across a first path of the plurality of paths based on a first header value;
define a policy that shifts a portion of the first set of egress traffic from the first path to at least one other path of the plurality of paths;
select a first set of the plurality of nodes that generates the first set of the egress traffic routing through the first path, wherein the first set of nodes comprises one or more of the plurality of nodes;
shift the portion of the first set of egress traffic from the first path to a second path of the plurality of paths by configuring the first set of nodes with the policy and a second header value in addition to the first header value, wherein the second header value is used to route traffic through the second path, and wherein the first set of nodes label a first subset of the first set of egress traffic with the first header value, and label a second subset of the first set of egress traffic with the second header value according to the policy and a configuration of the first set of nodes comprising the first header value and the second header value;
determine, after said shifting, that performance of the common site or the first path does not satisfy a threshold;
select a different second set of the plurality of nodes that generates a second set of the egress traffic routing through the first path; and
shift the second set of the egress traffic from the first path to the second path by configuring the second set of nodes with the policy and the second header value in addition to the first header value.

17. The device of claim 16, wherein the one or more processors are further configured to:
identify a first potential shift of the second set of the egress traffic that routes through the first path and that is directed to a first set of destinations, and a second potential shift of a third set of the egress traffic that routes through the first path and that is directed to a second set of destinations; and
implement the first potential shift instead of the second potential shift in response to the first potential shift implementing with fewer changes to the policy, wherein implementing the first potential shift comprises moving the second set of egress traffic from the first path to the second path.

18. A device comprising
one or more processors configured to:
monitor a plurality of paths from which egress traffic, that is generated by a plurality of nodes operating in a common site, traverses a network;
determine an issue affecting a first path of the plurality of paths based on said monitoring;
identify a first potential shift of a first set of the egress traffic that routes through the first path and that is directed to a first set of destinations, and a second potential shift of a second set of the egress traffic that routes through the first path and that is directed to a second set of destinations; and implement the first potential shift instead of the second potential shift in response to the first potential shift implementing with fewer changes to at least one routing policy, that controls the distribution of the egress traffic across the plurality of paths, than the second potential shift, wherein implementing the first potential shift comprises moving the first set of egress traffic from the first path to at least a second path of the plurality of paths.

19. A method comprising:

monitoring a plurality of paths from which egress traffic, that is generated by a plurality of nodes operating in a common site, traverses a network, wherein said monitoring comprises tracking a first set of the egress traffic that routes across a first path of the plurality of paths based on a first header value;

defining a policy that shifts a portion of the first set of egress traffic from the first path to at least one other path of the plurality of paths;

determining resource utilization on each of the plurality of nodes;

selecting a set of the plurality of nodes that generates the first set of the egress traffic routing through the first path, wherein the first set of nodes comprises one or more of the plurality of nodes;

selecting a subset of the set of nodes based on the resource utilization;

shifting the portion of the first set of egress traffic from the first path to a second path of the plurality of paths by configuring the subset of nodes with the policy and a second header value in addition to the first header value, wherein the second header value is used to route traffic through the second path, and wherein the subset of nodes label a first subset of the first set of egress traffic with the first header value, and label a second subset of the first set of egress traffic with the second header value according to the policy and a configuration of the first set of nodes comprising the first header value and the second header value.

20. A device comprising:

one or more processors configured to:

monitor a plurality of paths from which egress traffic, that is generated by a plurality of nodes operating in a common site, traverses a network, wherein said monitoring comprises tracking a first set of the egress traffic that routes across a first path of the plurality of paths based on a first header value;

define a policy that shifts a portion of the first set of egress traffic from the first path to at least one other path of the plurality of paths;

determine resource utilization on each of the plurality of nodes;

select a set of the plurality of nodes that generates the first set of the egress traffic routing through the first path, wherein the first set of nodes comprises one or more of the plurality of nodes;

select a subset of the set of nodes based on the resource utilization;

shift the portion of the first set of egress traffic from the first path to a second path of the plurality of paths by configuring the subset of nodes with the policy and a second header value in addition to the first header value, wherein the second header value is used to route traffic through the second path, and wherein the subset of nodes label a first subset of the first set of egress traffic with the first header value, and label a second subset of the first set of egress traffic with the second header value according to the policy and a configuration of the first set of nodes comprising the first header value and the second header value.

* * * * *